United States Patent [19]

Hagihara et al.

[11] Patent Number: 5,096,606
[45] Date of Patent: Mar. 17, 1992

[54] REFRIGERATION OIL COMPOSITION CONTAINING A FLUOROETHANE AND AN ESTER COMPOUND

[75] Inventors: Toshiya Hagihara, Osaka; Akimitsu Sakai, Wakayama, both of Japan

[73] Assignee: Kao Corporation, Tokyo, Japan

[21] Appl. No.: 568,027

[22] Filed: Aug. 16, 1990

[30] Foreign Application Priority Data

Sep. 1, 1989 [JP] Japan ................. 1-226846
Dec. 4, 1989 [JP] Japan ................. 1-314657

[51] Int. Cl.⁵ ................. C09K 5/00; C10M 109/02
[52] U.S. Cl. ................. 252/68; 252/67; 252/56 R; 252/56 S; 252/54
[58] Field of Search ............ 252/68, 67, 56 R, 56 S, 252/54

[56] References Cited

U.S. PATENT DOCUMENTS

| | | | |
|---|---|---|---|
| 4,199,461 | 4/1980 | Olund | 252/68 |
| 4,557,850 | 12/1985 | Ando et al. | 252/68 |
| 4,755,316 | 7/1988 | Magid et al. | 252/68 |
| 4,780,229 | 10/1988 | Mullin | 252/32.5 |
| 4,851,144 | 7/1989 | McGraw et al. | 252/52 A |
| 4,948,525 | 8/1990 | Sasaki et al. | 252/52 A |

FOREIGN PATENT DOCUMENTS

| | | |
|---|---|---|
| 5155093 | 12/1980 | Japan . |
| 56-36570 | 4/1981 | Japan . |
| 6125494 | 10/1981 | Japan . |
| 6125495 | 10/1981 | Japan . |
| 6131548 | 10/1981 | Japan . |
| 6133241 | 10/1981 | Japan . |
| 58-15592 | 1/1983 | Japan . |
| 8103594 | 6/1983 | Japan . |
| 59-164393 | 9/1984 | Japan . |
| 9164393 | 9/1984 | Japan . |
| 61-62596 | 3/1986 | Japan . |
| 171799 | 8/1986 | Japan . |
| 1181895 | 8/1986 | Japan . |
| 2000592 | 1/1987 | Japan . |
| 62-143609 | 12/1987 | Japan . |
| 62-292895 | 12/1987 | Japan . |
| 1460665 | 1/1977 | United Kingdom . |
| 2216541 | 10/1989 | United Kingdom . |

Primary Examiner—Prince Willis, Jr.
Assistant Examiner—J. Silbermann
Attorney, Agent, or Firm—Birch, Stewart, Kolasch & Birch

[57] ABSTRACT

The refrigeration oil composition comprises (1) a hydrogenated fluoroethane and (2) an ester compound obtained from (2-a) an aliphatic polyhydric alcohol having 1 to 6 primary hydroxyl groups, (2-b) a saturated aliphatic monocarboxylic acid having 2 to 9 carbon atoms, straight or branched, or a derivative thereof and (2-c) a saturated aliphatic dicarboxylic acid having 2 to 10 carbon atoms, straight or branched, or a derivative thereof, said ester compound having a kinematic viscosity at 100 degree C. of 1 to 100 cst.

9 Claims, No Drawings

REFRIGERATION OIL COMPOSITION CONTAINING A FLUOROETHANE AND AN ESTER COMPOUND

The invention relates to a refrigeration oil composition, a lubricating oil for a refrigerator or a refrigerator oil, comprising a hydrogenated fluoroethane.

PRIOR ARTS

The use of dichlorodifluoromethane (R-12) in a refrigerator and an automotive air conditioner has recently been restricted and will be inhibited in the future in order to protect the ozone layer. Therefore, various fluoroethane refrigerants which do not destroy the ozone layer have been developed as a substitute for this R-12.

Since these fluoroethane refrigerants have higher polarity than R-12, they have only low compatibility with lubricating oils that have been used conventionally as a refrigerator oil, such as naphthenic mineral oil, poly-α-olefin or alkylbenzene, and cause phase separation at lower temperature. If this phenomenon occurs, oil return deteriorates and a thick oil film adheres around a condenser or an evaporator as a heat-exchanger, prevents heat transfer and results in critical defects such as poor lubrication, bubbling at the start, and so forth. Accordingly, the conventional refrigerator oils cannot be used as a refrigerator oil in an atmosphere of these new refrigerants.

As to the lubricating property, R-12 is effective in that it is partially decomposed to generate hydrogen chloride which reacts with the friction surface to form a chloride film, thus improving the lubricating property. Since, however, fluoroethane refrigerants which do not contain chlorine atom(s), such as pentafluoroethane, 1,1,1-trifluoroethane or 1,1-difluoroethane, cannot be expected to provide such an effect, a refrigerator oil used in combination with them must have a higher lubricating property than that of conventional refrigerator oil.

Furthermore, the refrigerator oil must satisfy the requirements that it has high thermal stability in a refrigerant atmosphere and does not exert adverse effects on organic materials such as an insulating material used for a refrigerator and a hose used for an automative air conditioner.

To solve the problem of poor compatibility of the lubricating oils with the fluoroethane refrigerants, a polyether lubricating oil has been proposed. Since this type of lubricating oil has higher polarity than that of a naphthenic mineral oil, it is true that it has good compatibility with these refrigerants at low temperatures. As described in U.S. Pat. No. 4,755,316, however, the polyether lubricating oil involves a problem in that when a temperature rises, it is likely to cause phase separation, so that it cannot be used reliably as the refrigerator oil.

There are some other problems in the polyether lubricating oil. One of them is that since it has high polarity, it interacts with the insulating material used in the refrigerator such as a PET film, and exerts adverse effects on the latter. Another problem is its high hygroscopicity. The moisture in this lubricating oil deteriorates the thermal stability in a refrigerant atmosphere and causes hydrolysis of the PET film as the organic material, and the like.

Furthermore, as to the lubricating property, too, the polyether lubricating oil cannot be said to be entirely satisfactory. In comparison with the conventional $R$-12—naphthenic mineral oil system, the fluoroethane refrigerant—polyether lubricating oil system has poor lubricating property.

On the other hand, in the field of the refrigerator oils, several methods of using esters in combination with fluoromethane have been proposed and are disclosed in, for example, Japanese Patent Laid-Open Nos. 131548/1981, 133241/1981, 181895/1986, and 592/1987. The use of esters as a mixture with other lubricating oils is disclosed in Japanese Patent Laid-Open Nos. 125494/1981, 125495/1981 and 62596/1986. Furthermore, the use of esters together with additives is disclosed in Japanese Patent Laid-Open Nos. 155093/1980, 36570/1981, 125494/1981, 15592/1983, 103594/1983, 171799/1986, and 292895/1987. However, all of these prior art methods are directed to the systems used in combination with dichlorodifluoromethane ($R$-12) or monochlorodifluoromethane ($R$-22) refrigerant but do not at all mention the fluoroethane refrigerant. Further, the object of these methods is to improve the thermal stability in $R$-12 or $R$-22 atmosphere. Japanese Patent Laid-Open Nos. 143609/1978 and 164393/1984 mention the compatibility with R-12 or R-22 besides the improvement of the thermal stability in F-12 or R-22 atmosphere. However, the former is directed to the prevention of excessive dissolution in R-12 and the latter in $R$-22. In other words, they do not at all mention an improvement in the compatibility with the fluoroethane refrigerant.

As described above, the prior art technique is not directed to the development of a refrigerator oil having excellent compatibility, thermal stability and lubricating properties in a fluoroethane refrigerant atmosphere and no particular proposal has been made, either.

Accordingly, it is an object of the present invention to provide a refrigerator oil which has sufficient viscosity and high compatibility with the fluoroethane refrigerant at both low and high temperatures, and has excellent thermal stability and lubricating property in this refrigerant atmosphere.

As a result of intensive studies in order to accomplish the objects described above, the inventors have found out that certain kinds of ester compounds can accomplish the objects described above, and thus have completed the present invention.

The refrigeration oil composition of the invention comprises (1) a hydrogenated fluoroethane and (2) an ester compound obtained from (2-a) an aliphatic polyhydric alcohol having 1 to 6 primary hydroxyl groups, (2-b) a saturated aliphatic monocarboxylic acid having 2 to 9 carbon atoms, straight or branched, or a derivative thereof and (2-c) a saturated aliphatic dicarboxylic acid having 2 to 10 carbon atoms, straight or branched, or a derivative thereof, said ester compound having a kinematic viscosity at 100 degree C. of 1 to 100 cst.

It is preferable that a weight ratio of (1) the hydrogenated fluoroethane to (2) the ester compound ranges from 10/1 to 1/5, more preferably from 5/1 to ½.

The above composition further comprises another lubricant at a weight ratio to the ester compound of up to 95 wt. %.

The ester compound may have a kinematic viscosity at 100 degree C. of 1 to 20 cst or another range of 20 to 100 cst.

A preferable ester compound is obtained from (2-a) an aliphatic dihydric alcohol having 1 to 2 primary hydroxyl groups, called (d), (2-b) a saturated aliphatic monocarboxylic acid having 2 to 9 carbon atoms, straight or branched, or a derivative thereof and (2-c) a saturated aliphatic dicarboxylic acid having 2 to 8 carbon atoms, straight or branched, or a derivative thereof, called (e).

The ester compound may be obtained from 1 mole of (2-a), 4 mole or less of (2-b) and 0.9 mole or less of (2 c). The ester compound may have a saponification value of 330 mg KOH/g or larger. The hydrogenated fluoroethane may be 1,1,1,2-tetrafluoroethane.

Thus the present invention provides a refrigerator oil for use in a hydrogenated fluoroethane refrigerant atmosphere, characterized by containing, as a base oil, an ester obtained from:

(a) an aliphatic polyhydric alcohol having one to six primary hydroxyl groups;
(b) a $C_2$ to $C_9$ straight-chain or branched saturated aliphatic monocarboxylic acid or a derivative thereof; and
(c) a $C_2$ to $C_{10}$ straight-chain or branched saturated aliphatic dicarboxylic acid or a derivative thereof.

The aliphatic polyhydric alcohol as component (a) used for the preparation of the ester of this invention represents those polyhydric alcohols wherein one to six hydroxyl groups among all the hydroxyl groups are primary. Particular examples thereof include hindered alcohols such as neopenthyl glycol, 2,2-diethyl-1,3-propanediol, 2-n-butyl-2-ethyl-1,3-propanediol, trimethylolethane, trimethylolpropane, trimethylolnonane, pentaerythritol and dipentaerythritol; and polyhydric alcohols such as ethylene glycol, diethylene glycol, polyethylene glycol, propylene glycol, dipropylene glycol, polypropylene glycol, 1,3-propanediol, 1,2-butanediol, 1,4-butanediol, 1,6-hexanediol, glycerol, diglycerol, polyglycerol, 1,2,4-butanetriol, 1,2,6-hexanetriol, sorbitol and mannitol. The number of carbon atoms of these aliphatic polyhydric alcohols ranges from 2 to 30, preferably from 2 to 20 and further preferably from 2 to 10. If the number of carbon atoms is greater than 30, the viscosity becomes high and the compatibility with the fluoroethane refrigerant drops. If the number of the primary hydroxyl groups is greater than 6, the viscosity becomes excessively high. From the aspect of heat resistance, the hindered alcohols are particularly excellent.

The carboxylic acid or its derivative used for the preparation of the ester of the present invention includes straight-chain and branched saturated monocarboxylic acids and their derivatives as component (b) and straight-chain and branched saturated aliphatic dicarboxylic acids and their derivatives as component (c).

The number of carbon atoms of the monocarboxylic acid as component (b) ranges from 2 to 9, preferably from 5 to 8. If the number of carbon atoms is greater than 9, the compatibility with the fluoroethane refrigerant drops. Particular examples of these monocarboxylic acids and their derivatives include acetic acid, propionic acid, butyric acid, isobutyric acid, valeric acid, isovaleric acid, pivalic acid, 2-methylbutyric acid, caproic acid, 2-methylvaleric acid, 3-methylvaleric acid, 4-methylvaleric acid, 2,2-dimethylbutyric acid, 2-ethylbutyric acid, tertbutylacetic acid, enanthoic acid, 2,2-dimethylpentanoic acid, 2-ethylpentanoic acid, 3-ethylpentanoic acid, 2-methylhexanoic acid (isoheptanoic acid), 3-methylhexanoic acid, 4-methylhexanoic acid, 5-methylhexanoic acid, caprylic acid, 2-ethylhexanoic acid, 3,5-dimethylhexanoic acid, 2,2-dimethylhexanoic acid, 2-methylheptanoic acid (isooctanoic acid), 3-methylheptanoic acid, 4-methylheptanoic acid, 2-propylpentanoic acid, pelargonic acid, 2,2-dimethylheptanoic acid, 3,5,5-trimethylhexanoic acid, 2-methyloctanoic acid, 2-ethylheptanoic acid, 3-methyloctanoic acid, and their methyl esters, ethyl esters and acid anhydrides.

The number of carbon atoms of the dicarboxylic acid of the component (c) ranges from 2 to 10. If it is greater than 10, the compatibility with the fluoroethane refrigerant drops. Particular examples of these dicarboxylic acids and their derivatives include oxalic acid, malonic acid, methylmalonic acid, succinic acid, ethylmalonic acid, dimethylmalonic acid, methylsuccinic acid, glutaric acid, adipic acid, 2,2-dimethylsuccinic acid, 2,3-dimethylsuccinic acid, 2-methylglutaric acid, 3-methylglutaric acid, butylmalonic acid, diethylmalonic acid, 2,2-dimethylglutaric acid, 2,4-dimethylglutaric acid, 3,3-dimethylglutaric acid, 2-ethyl-2-methylsuccinic acid, 3-methyladipic acid, pimelic acid, suberic acid, 2,2-dimethyladipic acid, azelaic acid, sebacic acid, and their methyl esters, ethyl esters and acid anhydrides.

The ester to be used in the present invention is obtained by reacting components (a) to (c) together.

The compatibility of the ester of the present invention with the fluoroethane refrigerant at low temperatures generally drops with an increasing viscosity. Accordingly, from the aspect of compatibility, the kinematic viscosity of the ester at 100° C. is preferably not smaller than 1 cst but not greater than 20 cst and, still preferably, not smaller than 1 cst but not greater than 15 cst. If the kinematic viscosity at 100° C. is greater than 20 cst, the compatibility with the fluoroethane refrigerant at low temperatures drops. As to the lubricating property in an atmosphere of the fluoroethane refrigerant, on the other hand, the ester of the present invention is superior to the polyether lubricating oil. Among the esters of the present invention, those having a higher viscosity have a more excellent lubricating property and esters having a kinematic viscosity of higher than 20 cst at 100° C. have a particularly preferred lubricating property. In consideration of the compatibility, those esters whose kinematic viscosity at 100° C. is not greater than 100 cst are preferred. The ester of the present invention having a kinematic viscosity of higher than 20 cst at 100° C. can be used as such as the base oil and also as a mixture with the esters of the invention whose kinematic viscosity at 100° C. is not greater than 20 cst, with the esters other than those of the present invention or with synthetic oils such as polyether. When the ester of the invention is mixed in this manner, the lubricating property of the esters of the present invention, whose kinematic viscosity at 100° C. is not greater than 20 cst, the esters other than those of the present invention, or the synthetic oils such as polyether can be improved. As to the esters of the present invention whose kinematic viscosity at 100° C. is greater than 20 cst and whose compatibility with the fluoroethane refrigerant at low temperatures is not good, their compatibility with the fluoroethane refrigerant at low temperatures can be improved by mixing them with the ester of the present invention whose kinematic viscosity at 100° C. is not greater than 20 cst, as described above.

Among the esters of the present invention, those obtained from a dihydric alcohol (d) having one to two primary hydroxyl groups among the component (a), the $C_2$ to $C_9$ straight-chain or branched saturated aliphatic monocarboxylic acid (b) or its derivative, and the $C_2$ to $C_8$ straight-chain or branched saturated aliphatic dicarboxylic acid (e) or its derivative among component (c) have particularly excellent compatibility with the fluoroethane refrigerant at low temperatures and excellent lubricating property.

Particular examples of the component (d) described above include dihydric alcohols such as ethylene glycol, diethylene glycol, polyethylene glycol, propylene glycol, dipropylene glycol, polypropylene glycol, 1,3-propanediol, 1,2-butanediol, 1,4-butanediol, 1,6-hexanediol, and 2-ethyl-1,3-hexanediol; and hindered alcohols represented by the following formula (I). The number of carbon atoms of the aliphatic dihydric alcohol ranges from 2 to 30, preferably from 2 to 20 and further preferably from 2 to 10. From the aspect of the heat resistance, the hindered alcohol represented by the following formula (I) is particularly excellent:

where $R_1$ and $R_2$ are each a $C_1$ to $C_6$ alkyl group.

Particular examples of the component (e) described above include oxalic acid, malonic acid, methylmalonic acid, succinic acid, ethylmalonic acid, dimethylmalonic acid, methylsuccinic acid, glutaric acid, adipic acid, 2,2-dimethylsuccinic acid, 2,3-dimethylsuccinic acid, 2-methylglutaric acid, 3-methylglutaric acid, butylmalonic acid, diethylmalonic acid, 2,2-dimethylglutaric acid, 2,4-dimethylglutaric acid, 3,3-dimethylglutaric acid, 2-ethyl-2-methylsuccinic acid, 3-methyladipic acid, pimelic acid, suberic acid, and 2,2-dimethyladipic acid.

In comparison with the other esters of the present invention, the ester obtained from the components (b), (d) and (e) has much excellent compatibility with the fluoroethane refrigerant at low temperatures when the kinematic viscosity is high. Even when the kinematic viscosity at 100° C. is greater than 20 cst, the compatibility is sufficiently excellent. As to the lubricating property, this ester is better than those obtained from the tri- or higher-hydric alcohols of the same viscosity grade among the esters of the present invention.

In the ester of the present invention, any of the alcohol, monocarboxylic acid and dicarboxylic acid as the starting materials preferably has a branched structure from the aspect of corrosion resistance to metals and hydrolysis stability. From the aspect of the compatibility with the fluoroethane refrigerant, the saponification value of the ester of the present invention is preferably at least 330 mgKOH/g and further preferably at least 350 mgKOH/g. If the saponification value is smaller than this value, the compatibility with the fluoroethane refrigerant drops.

The ester used in the present invention comprises at least one kind of polyhydric alcohol (a) described above, at least one kind of monocarboxylic acid, its lower alkyl ester or its acid anhydride (b) and at least one kind of dicarboxylic acid, its lower alkyl ester or its acid anhydride (c), and can be obtained by an ordinary esterification or transesterification reaction. In this case, up to 0.9 mol of the dicarboxylic acid or its derivative is reacted with 1 mol of the polyhydric alcohol. If the amount of the acid is greater than 0.9 mol, the viscosity becomes high. The acid value of the resulting ester is preferably as low as possible and is up to 5 mgKOH/g, preferably up to 1 mgKOH/g and particularly preferably up to 0.2 mgKOH/g.

The refrigerator oil of the present invention contains the ester described above as the base oil, and may further contain mineral oil and synthetic oil such as poly-α-olefin, alkylbenzene, esters other than those described above, polyethers, perfluoropolyethers, phosphoric esters or mixtures thereof. However, the synthetic oil is not limited to those described above. The weight ratio in the mixture of the ester of this invention to other lubricating oil may be arbitrary so long as the performance such as the compatibility with the hydrogenated fluoroethane refrigerant is not lowered. Generally, the weight ratio ranges from 100/0 to 5/95, preferably 100/0 to 10/90, and further preferably 100/0 to 30/70.

The ester of the present invention has excellent performance with respect to the fluoroethane refrigerant and can provide a refrigerator oil excellent in compatibility, thermal stability and lubricating property particularly when used in a hydrogenated fluoroethane refrigerant atmosphere. Examples of the hydrogenated fluoroethane refrigerant include 1,1,1,2-tetrafluoroethane ($_R$-134a), 1,1,1,2-tetrafluoro-2-chloroethane ($_R$-124), pentafluoroethane ($_R$-125), 1,1-difluoro-1-chloroethane ($_R$-142b), 1,1,1-trifluoroethane ($_R$-143a), and 1,1-difluoroethane ($_R$-152).

It is possible to add ordinary lubricant additives such as an antioxidant, an extreme-pressure additive, an oiliness improving agent, a defoaming agent, a metal deactivator, and the like, to the refrigerator oil of the present invention, whenever necessary.

Examples of the antioxidants that can be used include phenolic antioxidants such as 2,6-di-t-butyl-4-methylphenol and 4,4'-methylenebis(2,6-di-t-butylphenol); amine antioxidants such as p,p-dioctylphenylamine, monooctyldiphenylamine, phenothiazine, 3,7-dioctylphenothiazine, phenyl-1-naphthylamine, phenyl-2-naphthylamine, alkylphenyl-1-naphthylamine, and alkylphenyl-2-naphthylamine; sulfur-containing antioxidants such as alkyl disulfide, thiodipropionic acid esters and benzothiazole; and zinc dialkyl dithiophosphate and zinc diaryl dithiophosphate.

Examples of the extreme-pressure additive and oiliness improving agents that can be used include zinc compounds such as zinc dialkyl dithiophosphate and zinc diaryl dithiophosphate; sulfur compounds such as thiodipropinoic acid esters, dialkyl sulfide, dibenzyl sulfide, dialkyl polysulfide, alkylmercaptan, dibenzothiophene and 2,2'-dithiobis(benzothiazole); phosphorus compounds such as triaryl phosphates such as tricresyl phosphate and trialkyl phosphates; dialkyl or diaryl phosphates; trialkyl or triaryl phosphites; dialkyl or diaryl phosphites; monoalkyl or monoaryl phosphites; fluorine compounds such as perfluoroalkyl polyethers, trifluorochloroethylene polymers and graphite fluoride; silicon compounds such as a fatty acid-modified silicone; molybdenum disulfide, graphite, and the like.

Examples of the defoaming agents that can be used include a silicone oil such as dimethylpolysiloxane and organosilicates such as diethyl silicate. Examples of the metal deactivators that can be used include alizarin, quinizarin and mercaptobenzothiazole. Furthermore, epoxy compounds such as phenyl glycidyl ethers, alkyl glycidyl ethers, epoxystearic acid esters and epoxidized vegetable oil, organotin compounds and boron compounds may be added as the additive for stabilizing refrigerants.

The refrigeration oil in accordance with the present invention has sufficient viscosity, high compatibility with the hydrogenated fluoroethane refrigerants, and excellent thermal stability and lubricating property in this refrigerant atmosphere, and is excellent as a refrigerator lubricating oil.

EXAMPLE

Now the present invention will be described more specifically with reference to Examples thereof, though it is not limited to these Examples.

Example 1

A stirrer, a thermometer, a nitrogen blow pipe and a dehydration tube equipped with a cooler were fitted to a 1-l four-necked flask. Then, 104 g (1.0 mol) of neopentyl glycol, 116 g (1.0 mol) of caproic acid and 66 g (0.5 mol) of glutaric acid were put into the flask to conduct esterification at 240° C. for 10 hours in a nitrogen stream to thereby obtain the ester as the product No. 1 of the invention.

Similar reactions were carried out by use of the alcohols and carboxylic acids listed in Table 1 and the esters Nos. 2 to 14 of the present invention and the esters Nos. 1 to 7 of the Comparative Products were obtained.

The esters Nos. 1 to 14 of the invention, the comparative products Nos. 1 to 13 were tested to determine a kinematic viscosity at 40°C., at 100° C. and a viscosity index according to JIS K2283, and then a pour point according to JIS K2269. Results are shown in Table 1.

the Comparative Products Nos. 1 to 13 obtained in Example 1 and the product No. 15 of this invention as the mixture of the product No. 9 of this invention (10 wt %) and the product No. 1 of this invention (90 wt %) with 1,1,1,2-tetrafluoroethane ($R$-134a), the phase separation temperatures at both low and high temperatures of each sample in the concentration of 10 vol % for 1,1,1,2-tetrafluoroethane were measured.

As to the Comparative Products having an insufficient low temperature phase separation temperature, the measurement of the high temperature phase separation temperature was omitted.

The results are given in Table 2.

As can be understood clearly from Table 2, the esters of the present invention had excellent compatibility with 1,1,1,2-tetrafluoroethane at the low temperature and the compatibility did not drop even when the temperature rose. Among the esters of the present invention, those which were obtained from the components (b), (d) and (e) (the products Nos. 1, 2, 3, 10 and 11 of this invention) had sufficiently high compatibility even when the viscosity was high. The ester of the present invention having a kinematic viscosity of greater than 20 cst at 100° C. (the product No. 9 of this invention) can improve the compatibility with the fluoroethane refrigerant when mixed with the esters having a kinematic viscosity of not greater than 20 cst.

TABLE 2

| | Low-temperature separation temperature (°C.) | High-temperature separation temperature (°C.) |
| --- | --- | --- |
| Product of this invention 1 | −60> | 70< |
| this invention 2 | −60> | 70< |

TABLE 1

| | | Alcohol | Monocarboxylic acid (mol/mol alcohol) | Dicarboxylic acid (mol/mol alcohol) | Viscosity (cst) 40° C. | Viscosity (cst) 100° C. | Viscosity index | Pour point (°C.) |
| --- | --- | --- | --- | --- | --- | --- | --- | --- |
| Product of this invention | 1 | neopentyl glycol | caproic acid (1.0) | glutaric acid (0.5) | 29.0 | 5.74 | 144 | −55> |
| | 2 | neopentyl glycol | caprylic acid (0.8) | glutaric acid (0.6) | 59.5 | 9.59 | 144 | −50 |
| | 3 | neopentyl glycol | isooctanoic acid (1.2) | adipic acid (0.4) | 29.8 | 5.36 | 114 | −55> |
| | 4 | neopentyl glycol | enanthoic acid (1.2) | azelaic acid (0.4) | 23.9 | 5.49 | 179 | −55> |
| | 5 | trimethylolpropane | caproic acid (2.6) | glutaric acid (0.2) | 20.3 | 4.41 | 131 | −55> |
| | 6 | trimethylolpropane | isoheptanoic acid (2.6) | adipic acid (0.2) | 28.3 | 5.21 | 115 | −55> |
| | 7 | trimethylolpropane | caproic acid (2.6) | sebacic acid (0.2) | 19.4 | 4.41 | 142 | −55> |
| | 8 | pentaerythritol | valeric acid (3.5) | adipic acid (0.25) | 33.0 | 6.22 | 130 | −55> |
| | 9 | trimethylolpropane | caproic acid (1.8) | adipic acid (0.6) | 168 | 20.9 | 146 | −55> |
| | 10 | neopentyl glycol | isoheptanoic acid (0.84) | glutaric acid (0.58) | 56.5 | 8.69 | 129 | −55> |
| | 11 | neopentyl glycol | isoheptanoic acid (0.6) | glutaric acid (0.7) | 206 | 21.0 | 121 | −35 |
| | 12 | neopentyl glycol | isoheptanoic acid (0.4) | glutaric acid (0.8) | 1010 | 64.6 | 126 | −27.5 |
| | 13 | ethylene glycol | 2-ethylhexanoic acid (1.0) | glutaric acid (0.5) | 16.9 | 4.00 | 138 | −55> |
| | 14 | glycerol | caproic acid (2.6) | adipic acid (0.2) | 13.6 | 3.74 | 177 | −55> |
| Comparative product | 1 | trimethylolpropane | caprylic aicd (1.46) capric acid (0.70) | adipic acid (0.42) | 75.7 | 11.7 | 149 | −52.5 |
| | 2 | trimethylolpropane | oleic acid (1.86) | adipic acid (0.57) | 195 | 25.2 | 160 | −30 |
| | 3 | trimethylolpropane | caproic aicd (2.8) | 1,18-(8-ethyl)-octadecanoic diacid (0.1) | 19.1 | 4.36 | 142 | −55> |
| | 4 | neopentyl glycol | capric acid (0.8) | glutaric acid (0.6) | 64.9 | 10.4 | 147 | −55> |
| | 5 | neopentyl glycol | caproic acid (1.2) | 1,18-(8-ethyl)-octadecanoic diacid (0.4) | 51.1 | 9.92 | 185 | −55> |
| | 6 | trimethylolpropane | caprylic acid (2.1) capric acid (0.8) lauric acid (0.1) | | 19.7 | 4.42 | 140 | −42.5 |
| | 7 | pentaerythritol | lauric acid (1.2) 2-ethylhexanoic acid (2.8) | | 47.0 | 6.91 | 102 | −27.5 |
| | 8 | naphthene oil | | | 30.0 | 4.44 | 14 | −42.5 |
| | 9 | poly-α-olefin | | | 29.9 | 5.68 | 133 | −55> |
| | 10 | polyoxypropylene glycol monoalkyl ether | | | 33.5 | 6.94 | 174 | −55 |
| | 11 | poly(oxyethylene oxypropylene) glycol monoalkyl ether | | | 20.3 | 4.83 | 170 | −55 |
| | 12 | polyoxypropylene glycol monoalkyl ether | | | 60.2 | 10.7 | 170 | −50 |
| | 13 | polyoxypropylene glycol glycerol ether | | | 250 | 11.2 | −86 | −31 |

EXAMPLE 2

In order to examine the compatibility of each of the products Nos. 1 to 8 and 10 to 14 of this invention and TABLE 2-continued

|   | Low-temperature separation temperature (°C.) | High-temperature separation temperature (°C.) |
|---|---|---|
| 3 | −60> | 70< |
| 4 | −50 | 70< |
| 5 | −60> | 70< |
| 6 | −60 | 70< |
| 7 | −44 | 70< |
| 8 | −60> | 70< |
| 10 | −60> | 70< |
| 11 | −60> | 70< |
| 12 | −28 | 70< |
| 13 | −60> | 70< |
| 14 | −60> | 70< |
| 15*1 | −41 | 70< |
| Comparative product 1 | 30< | measurement omitted |
| 2 | 30< | measurement omitted |
| 3 | 30< | measurement omitted |
| 4 | −13 | measurement omitted |
| 5 | 30< | measurement omitted |
| 6 | 30< | measurement omitted |
| 7 | 30< | measurement omitted |
| 8 | 30< | measurement omitted |
| 9 | 30< | measurement omitted |
| 10 | −60> | 70< |
| 11 | −60> | 70< |
| 12 | −60> | 58 |
| 13 | 30< | measurement omitted |

Note:
*1Product No. 9 of this invention (10 wt %) + product No. 1 of this invention (90 wt %)

EXAMPLE 3

The load resistance of each of the products Nos. 1, 2, 4, 5, 7, 9, 11 and 12 of this invention and Comparative Products Nos. 8 to 11 was examined by carrying out the Falex test.

More specifically, while blowing 1,1,1,2-tetrafluoroethane (Flon 134a) at a rate of 150 cc/min, non-load rotation was effected for 10 minutes and then, after preliminary rotation was effected at 200 lb for 5 minutes, the load was increased by 50-lb load every two minutes to examine a seizure load.

The results are given in Table 3.

As can be understood clearly from Table 3, the naphthene oil (Comparative Product No. 8) has a lower load resistance when 1,1,1,2-tetrafluoroethane was blown (450 lb) than when dichlorodifluoromethane (R-12) was blown (Reference Example 1: 600 lb). The load resistance of poly-α-olefin (Comparative Product No. 9) and polyethers (Comparative Products Nos. 10 and 11) was not greater than 550 lb when 1,1,1,2-tetrafluoroethane was blown, so that they had inferior load resistance. On the other hand, the load resistance of each of the esters of the present invention was not smaller than 600 lb when 1,1,1,2-tetrafluoroethane was blown, so that they had superior load resistance. The esters having a kinematic viscosity of higher than 20 cst at 100° C. (Products Nos. 9, 11 and 12 of this invention) had particularly high load resistance. The load resistance of each of the dihydric alcohol esters (Products Nos. 1, 2, 4, 11 and 12 of this invention was higher than those of the trihydric alcohol esters.

TABLE 3

|   |   | Seizure load (lb) |
|---|---|---|
| Product of this invention | 1 | 1300 |
|   | 2 | 1200 |
|   | 4 | 1200 |
|   | 5 | 1100 |
|   | 7 | 1000 |
|   | 9 | 1400 |
|   | 11 | 1400< |
|   | 12 | 1400< |
| Comparative Products | 8 | 450 |
|   | 9 | 450 |
|   | 10 | 550 |
|   | 11 | 550 |
| Reference Example | 1*1 | 600 |

Note:
*1measured when dichlorodifluoromethane (R-12) of Comparative Product No. 8 was blown.

EXAMPLE 4

The wear resistance of each of the products Nos. 2, 3, 5, 6, 9 and 11 of this invention and Comparative Products Nos. 8 to 11 obtained in Example 1, the Product No. 16 of this invention as the mixture of the product No. 3 of this invention (70 wt %) and the product No. 11 of this invention (30 wt %) and the product No. 17 of this invention as the mixture of the product No. 5 of this invention (60 wt %) and the product No. 9 of this invention (40 wt %) was examined by carrying out the Falex test.

More specifically, non-load rotation was effected for 10 minutes while blowing 1,1,1,2-tetrafluoroethane ($R$-134a) at a rate of 150 cc/min and then preliminary rotation was effected at 200 lb for 5 minutes. Thereafter the rotation was effected at 350 lb for 60 minutes and the quantity of wear of the V block and pins after the operation was examined.

The results are given in Table 4.

As can be understood clearly from Table 4, the esters of the present invention had higher wear resistance than that of the naphthene oil (Comparative Product No. 8), the poly-α-olefin (Comparative Product No. 9) and the polyethers (Comparative Products Nos. 10 and 11) and the wear resistance was equal or superior to that when dichlorodifluoromethane ($R$-12) was blown into the naphthene oil (Reference Example 1). Among the esters of the present invention, those having a kinematic viscosity of greater than 20 cst at 100° C. (the products Nos. 9 and 11 of this invention) had particularly high wear resistance. The wear resistance could be improved by mixing esters having a kinematic viscosity of higher than 20 cst with the esters of the present invention having a kinematic viscosity of not greater than 20 cst (the products Nos. 16 and 17 of this invention). The dihydric alcohol esters (the products Nos. 2, 3 and 11 of this invention) had higher wear resistance than those of the trihydric alcohol esters.

TABLE 4

|   |   | Quantity of wear |
|---|---|---|
| Product of this invention | 2 | 9.8 |
|   | 3 | 13.9 |
|   | 5 | 17.6 |
|   | 6 | 14.8 |
|   | 9 | 9.3 |
|   | 11 | 6.3 |

TABLE 4-continued

|  |  | Quantity of wear |
|---|---|---|
|  | 16*1 | 8.0 |
|  | 17*2 | 9.9 |
| Comparative Product | 8 | seizure |
|  | 9 | " |
|  | 10 | 40.2 |
|  | 11 | 46.3 |
| Reference Example | 1*3 | 14.9 |

Notes:
*1 product No. 3 of this invention (70 wt %) + product No. 11 of this invention (30 wt %)
*2 product No. 5 of this invention (60 wt %) + product No. 9 of this invention (40 wt %)
*3 measured when dichlorodifluoromethane (R-12) of Comparative Product No. 8 was blown

EXAMPLE 5

The sealed tube test (175° C.×14 days) was carried out by use of iron, copper and aluminum as the catalyst in order to examine the thermal stability of each of the products Nos. 1, 2, 4, 5, 7, 11 and 13 of this invention obtained in Example 1 in an atmosphere of 1,1,1,2-tetrafluoroethane.

The results are given in Table 5.

As can be understood clearly from Table 5, each of the esters of the present invention had good appearance but did not give any precipitate, and had good thermal stability.

TABLE 5

|  | Appearance | Precipitate |
|---|---|---|
| Product of this invention 1 | good | nil |
| 2 | " | " |
| 4 | " | " |
| 5 | " | " |
| 7 | " | " |
| 11 | " | . " |
| 13 | " | " |

EXAMPLE 6

The hygroscopicity of each of the products Nos. 1, 2 and 5 of this invention and the Comparative Products Nos. 10 and 11 obtained in Example 1 was examined.

More specifically, the change with time of the moisture under the condition of 25° C. and 80% humidity was determined by the Karl-Fischer method.

The results are given in Table 6.

As can be understood clearly from Table 6, the esters of the present invention had lower hygroscopicity than those the polyethers of the Comparative Products.

TABLE 6

|  |  | Water quantity (ppm) | | | |
|---|---|---|---|---|---|
|  |  | 0 hr | 2 hr | 10 hr | 24 hr |
| Product of this invention | | | | | |
|  | 1 | 19 | 580 | 1100 | 1600 |
|  | 2 | 21 | 630 | 1200 | 1600 |
|  | 5 | 18 | 550 | 1100 | 1500 |
| Comparative product | 10 | 46 | 1900 | 5600 | 13000 |
|  | 11 | 49 | 4100 | 13000 | 29000 |

We claim:

1. A refrigeration oil composition comprising (1) fluoroethane selected from the group consisting of 1,1,1,2-fluoroethane, pentafluoroethane, 1,1,1 trifluoroethane, and 1,1-difluoroethane and (2) an ester compound which is a reaction product obtained from (a) an aliphatic polyhydric alcohol having 1 to 6 primary hydroxyl groups, (b) a saturated aliphatic straight or branches monocarboxylic acid having 2 to 9 carbon atoms, or a derivative thereof and (c) a saturated aliphatic straight or branched dicarboxylic acid having 2 to 10 carbon atoms, or a derivative thereof, said ester compound having a kinematic viscosity at 100 degree C. of 1 to 100 cst.

2. The composition as claimed in claim 1, in which a weight ratio of (1) the fluoroethane to (2) the ester compound is in the range of from 10/1 to 1/5.

3. The composition as claimed in claim 1, which further comprises an additional lubricant at a weight ratio to the ester compound of up to 95 wt. %.

4. The composition as claimed in claim 1, wherein the ester compound has a kinematic viscosity at 100 degree C. of 1 to 20 cst.

5. The composition as claimed in claim 1, wherein the ester compound has a kinematic viscosity at 100 degree C. of 20 to 100 cst.

6. The composition as claimed in claim 1, in which the ester compound is obtained from (a) an aliphatic dihydric alcohol having 1 to 2 primary hydroxyl groups, (b) a saturated straight or branched aliphatic monocarboxylic acid having 2 to 9 carbon atoms, or a derivative thereof and (c) a saturated straight or branched aliphatic dicarboxylic acid having 2 to 8 carbon atoms or a derivative thereof.

7. The composition as claimed in claim 1, in which the ester compound is obtained from 1 mole of (2-a), 4 mole or less of (2-b) and 0.9 mole or less of (2-c).

8. The composition as claimed in claim 1, in which the ester compound has a saponification value of 330 mg KOH/g or larger.

9. The composition as claimed in claim 1, which the fluoroethane is 1,1,1,2-tetrafluoroethane.

* * * * *